(12) United States Patent　　　(10) Patent No.: US 12,592,164 B2

Corathers et al.　　　(45) Date of Patent: Mar. 31, 2026

(54) VIRTUAL REALITY TRAINING SIMULATOR

(71) Applicant: Permco, Inc., Streetsboro, OH (US)

(72) Inventors: Brian Alan Corathers, Stow, OH (US); James Lancaster, Mantua, OH (US); Robert L. Shell, III, Hudson, OH (US); Robert L. Shell, IV, Hudson, OH (US)

(73) Assignee: Permco, Inc., Streetsboro, OH (US)

( * ) Notice: Subject to any disclaimer, the term of this patent is extended or adjusted under 35 U.S.C. 154(b) by 882 days.

(21) Appl. No.: 17/929,089

(22) Filed: Sep. 1, 2022

(65) Prior Publication Data

US 2024/0078930 A1　Mar. 7, 2024

(51) Int. Cl.

| | |
|---|---|
| *G09B 19/24* | (2006.01) |
| *G06F 3/01* | (2006.01) |
| *G06T 19/00* | (2011.01) |
| *G06V 40/10* | (2022.01) |
| *G09B 5/02* | (2006.01) |

(52) U.S. Cl.

CPC .............. *G09B 19/24* (2013.01); *G06F 3/014* (2013.01); *G06F 3/016* (2013.01); *G06T 19/006* (2013.01); *G06V 40/10* (2022.01); *G09B 5/02* (2013.01); *G06T 2219/2004* (2013.01); *G06T 2219/2008* (2013.01); *G06T 2219/2012* (2013.01)

(58) Field of Classification Search

None

See application file for complete search history.

(56) References Cited

U.S. PATENT DOCUMENTS

| | | | | |
|---|---|---|---|---|
| 9,633,481 | B2 * | 4/2017 | Persely | ................ G06T 19/006 |
| 9,824,436 | B2 * | 11/2017 | Persely | ................ G06T 19/006 |
| 10,108,266 | B2 * | 10/2018 | Banerjee | ................ G09B 23/30 |
| 10,796,486 | B2 * | 10/2020 | Myers | ................... G06T 19/006 |
| 10,810,899 | B1 * | 10/2020 | MacGillivray | ......... G06T 17/10 |
| 10,866,631 | B2 * | 12/2020 | Nguyen | ................. G06F 3/016 |
| 10,976,820 | B2 * | 4/2021 | Ganadas | ................ G06F 3/016 |

(Continued)

FOREIGN PATENT DOCUMENTS

| | | | | |
|---|---|---|---|---|
| WO | WO-2019204395 | A1 * | 10/2019 | ............. G06F 9/453 |
| WO | 2021/021328 | A2 | 2/2021 | |

OTHER PUBLICATIONS

SimLab Soft Turtorial: VR Events in Mechinical Training publishedat https://www.youtube.com/watch?v=n7p8vRgCZlg Jun. 11, 2018 (Year: 2018).*

(Continued)

*Primary Examiner* — Xuan M Thai

*Assistant Examiner* — Andrew Bodendorf

(74) *Attorney, Agent, or Firm* — Renner, Otto, Boisselle & Sklar, LLP

(57) ABSTRACT

A virtual reality (VR) system is provided for training a user to assemble a device in a virtual work area. The VR system sequentially displays an ordered list of steps by highlighting tools and locations in the virtual work area. The highlighted tools and locations indicate movement or processing of a component that is to be performed in the current step. In one embodiment, the VR system includes a haptic glove for providing touch sensation to a user. The haptic glove is used to train the user to detect issues in the surface finish of a component (e.g., a burr) during assembly.

16 Claims, 4 Drawing Sheets

(56) References Cited

U.S. PATENT DOCUMENTS

| | | | |
|---|---|---|---|
| 11,202,676 B2* | 12/2021 | Lightcap | A61B 5/24 |
| 11,416,065 B1* | 8/2022 | Chan | G06F 3/011 |
| 2002/0123812 A1* | 9/2002 | Jayaram | G06T 19/20 |
| | | | 345/475 |
| 2012/0308969 A1* | 12/2012 | Rataul | G05B 19/4188 |
| | | | 434/224 |
| 2016/0210781 A1* | 7/2016 | Thomas | G06F 3/017 |
| 2016/0291922 A1* | 10/2016 | Montgomerie | G11B 27/34 |
| 2018/0129276 A1* | 5/2018 | Nguyen | G06F 3/0304 |
| 2018/0356893 A1* | 12/2018 | Soni | G06F 3/014 |
| 2018/0357823 A1* | 12/2018 | Koniki | G09B 5/02 |
| 2018/0357922 A1* | 12/2018 | Dutta | G06F 16/13 |
| 2019/0005833 A1* | 1/2019 | Das | G09B 19/003 |
| 2019/0304188 A1* | 10/2019 | Bridgeman | G09B 5/14 |
| 2019/0324538 A1* | 10/2019 | Rihn | G06F 3/014 |
| 2019/0391647 A1* | 12/2019 | Rihn | G06F 3/017 |
| 2019/0392728 A1* | 12/2019 | Pike | G09B 19/003 |
| 2021/0065677 A1* | 3/2021 | Talwar | G10L 13/00 |
| 2021/0287451 A1* | 9/2021 | Baudisch | G06T 19/20 |
| 2022/0172633 A1* | 6/2022 | Jha | G06F 3/04815 |
| 2023/0068660 A1* | 3/2023 | Brent | G06F 9/453 |
| 2024/0412663 A1* | 12/2024 | Kim | G02B 27/0101 |

OTHER PUBLICATIONS

SimLab Soft "Getting Started: Interactive Training in VR" published at https://www.youtube.com/watch?v=eikYqZT_u1s Oct. 12, 2020 (Year: 2020).*

Carlson Patrick et al: "Virtual Training: Learning Transfer of Assembly Tasks", IEEE Transactions on Visualization and Computer Graphics, IEEE, USA, vol. 21 , No. 6, Jun. 1, 2015 (Jun. 1, 2015), pp. 770-782, XP011579729, ISSN: 1077-2626, DOI: 10.1109/TVCG.2015.2393871 [retrieved on Apr. 29, 2015].

* cited by examiner

64

62

66

50

64

66

100

Generate a training space using the processor circuitry 102

Display the training space with the display 104

Receive selection of an assemblage 106

Receive an instruction set for the selected assemblage 108

Sequentially display the ordered list of steps of the received instruction set 110

VIRTUAL REALITY TRAINING SIMULATOR

TECHNICAL FIELD

The present disclosure relates generally to virtual reality and more particularly to virtual reality-based training of hydraulic pump assembly.

BACKGROUND

Learning how to perform the steps required to assemble a hydraulic pump requires many hours of instruction, training, and practice. For example, a trainee needs to learn the order for assembling components pieces of the hydraulic pump, surface treatment of the components (e.g., oiling), mechanical processing of the components (e.g., filing), and how to operate the equipment required for assembling the hydraulic pump.

Typically, learning to assemble a hydraulic pump requires a trainee to operate a real-world workstation by performing the steps for assembling the hydraulic pump using real components. Such real-world training can tie up scarce resources including the workspace, tools, and components. Additionally, training often requires a trainer to teach the trainee, tying up the time of the trainer who could otherwise be assembling hydraulic pumps.

SUMMARY

The present disclosure provides a virtual reality (VR) system for training a user to assemble a device in a virtual work area by sequentially displaying an ordered list of steps that visually signify the next step by highlighting tools and locations in the virtual work area. In one embodiment, the VR system includes a haptic glove for providing touch sensation to a user to signify a surface finish of components of the assemblage.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
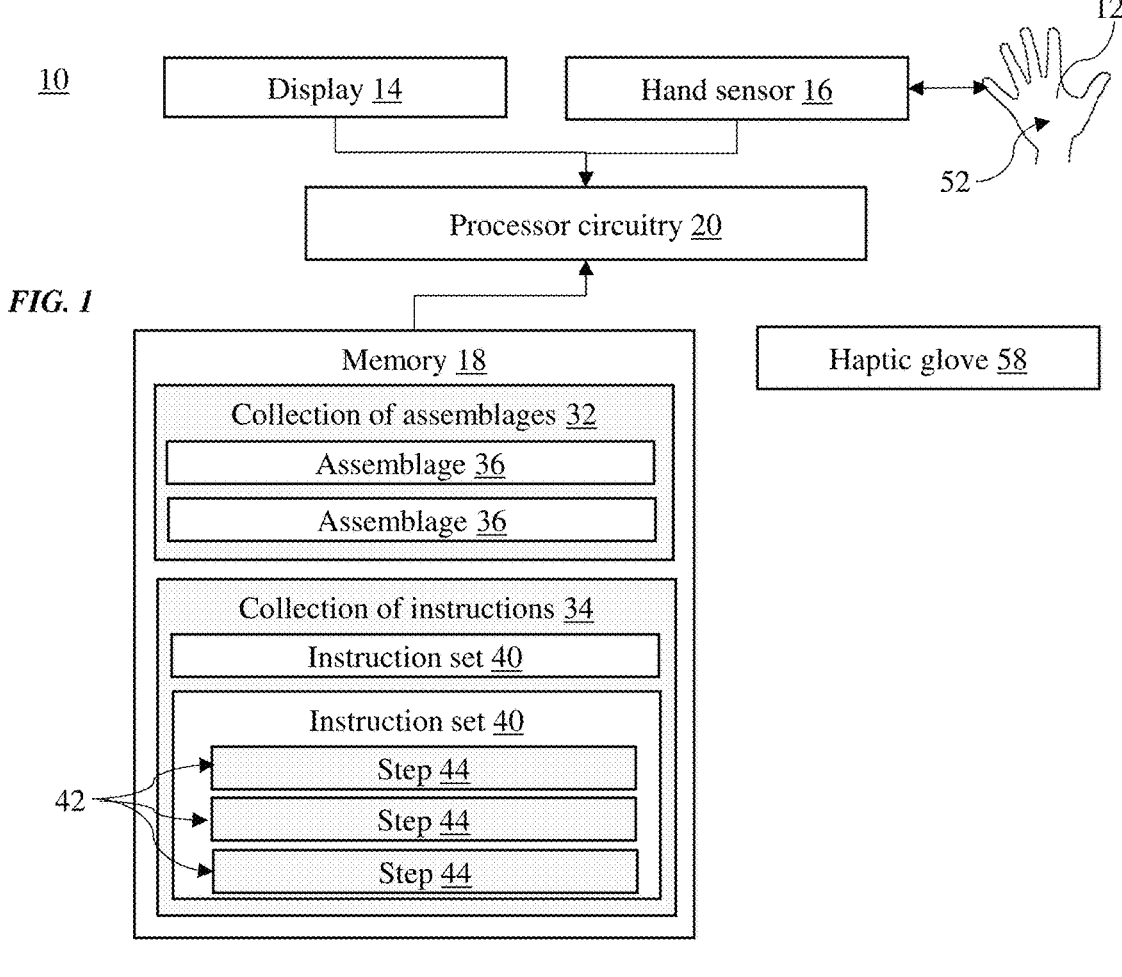
FIG. 1 shows an exemplary embodiment of a virtual reality system.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a virtual reality (VR) system is provided for training a user to assemble a device in a virtual work area. The VR system sequentially displays an ordered list of steps by highlighting tools and locations in the virtual work area. The highlighted tools and locations indicate movement or processing of a component that is to be performed in the current step. In one embodiment, the VR system includes a haptic glove for providing touch sensation to a user. The haptic glove is used to train the user to detect issues in the surface finish of a component (e.g., a burr) during assembly.

Figure 2:
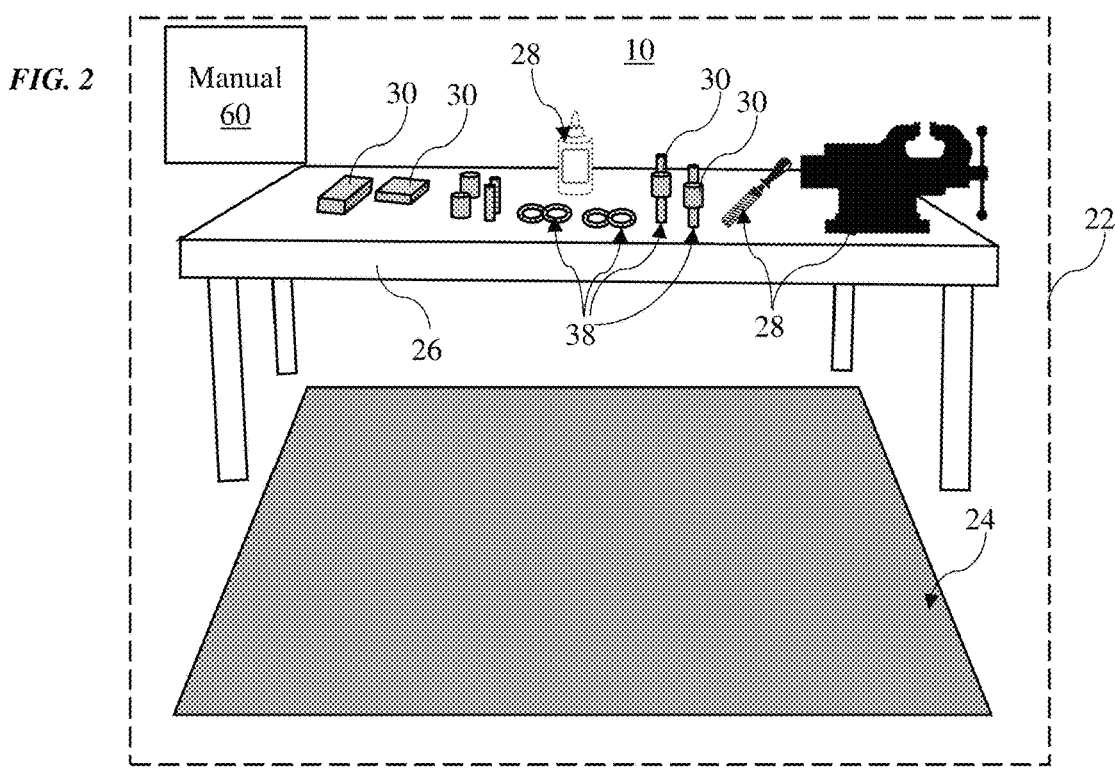
FIG. 2 shows an exemplary training space displayed by the virtual reality system.

Turning to FIG. 1, a virtual reality system 10 is shown for training a user to assemble a device 12. The virtual reality system 10 includes a display 14, a hand sensor 16, a memory 18, and processor circuitry 20. The display 14 displays a three-dimensional (3D) training space 22. The training space 22 includes a work area 24 having a work bench 26, an assortment of tools 28 arranged in the work area 24, and components 30 arranged in the work area 24. The hand sensor 16 detects a location of a hand 12 of the user. The memory 18 stores a collection of assemblages 32 and a collection of instructions 34. The processor circuitry 20 generates and causes the display 14 to display the training space 22. An exemplary training space 22 is shown in FIG. 2.

As will be understood by one of ordinary skill in the art, the memory 18 (also referred to as a computer readable medium) may be, for example, one or more of a buffer, a flash memory, a hard drive, a removable media, a volatile memory, a non-volatile memory, a random-access memory (RAM), or other suitable device. In a typical arrangement, the memory 18 may include a non-volatile memory for long term data storage and a volatile memory that functions as system memory for the processor 18. The memory 18 may exchange data with the circuitry over a data bus. Accompanying control lines and an address bus between the memory 18 and the circuitry also may be present. The memory 18 is considered a non-transitory computer readable medium.

The training space 22 may be any suitable virtual space for training a user to assemble the collection of assemblages 32. For example, the training space 22 may be a three-dimensional (3D) virtual room sufficiently sized to include the work bench 26, tools 28, and components 30. The work area 24 of the training space 22 may be the area of the training space 22 including the work bench 26, tools 28, and components 30. The training space 22 may include one or more work areas 24 (e.g., duplicate copies of the same work area).

The processor circuitry 20 receives a selection of an assemblage 36 from the collection of assemblages 32. Each assemblage 36 of the collection of assemblages 32 is formed by combining parts of the assemblage 38. The parts of the assemblage 38 are a subset of the components 30 arranged in the work area 24.

The parts 38 may be a subset of the components 30 arranged in the work area 24. That is, the work area 24 may not include any components not used to assemble a selected assemblage. Alternatively, the parts 38 may be a subset of the components 30, such that there are additional components not included in the selected assemblage 36. The components 30 may be virtual (also referred to as digital) representations of the parts used to assemble real world version of the assemblages.

The collection of assemblages 32 may be any suitable device assembled at least partially by hand. For example, the assemblages 36 may include hydraulic pumps and/or hydraulic motors.

The processor circuitry 20 receives an instruction set 40 for the selected assemblage 36. Each assemblage 36 is associated with an instruction set 40 from the collection of instructions 34. Each instruction set 40 of the collection of instructions 34 includes an ordered list of steps 40 performed to assemble the associated assemblage 36 by combining the parts of the assemblage 38. Each step 44 of the ordered list of steps 42 results in a sub-combination 46 of the assemblage 36 by: (1) adding at least one of the parts 38 to the sub-combination 46 or (2) processing at least one of the parts 38 of the assemblage using at least one tool of the assortment of tools 28. Each step 44 of the ordered list of steps 42 also identifies at least one of a next part 38 for adding to the sub-combination 46, a target location 56 for the next part 38, or a next tool 28 used for processing at least one of the parts of the assemblage 38.

The tools 28 may be virtual representations of the tools used in the real world to assemble the assemblages. For example, the tools may include vices, clamps, files, rasps, presses, drills, lubricant dispensers (such as oil), etc. The tools 28 present in the work area 24 may be only those tools needed to assemble the selected assemblage. Alternatively, the work area 24 may include additional tools 28 not needed to prepare the selected assemblage.

Figure 3:
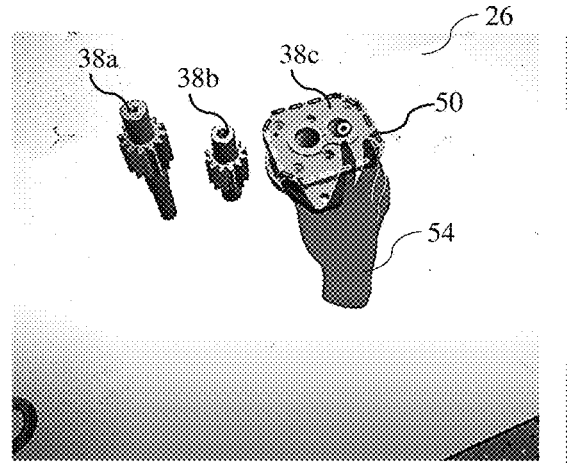
FIG. 3 is a zoomed in view of a work bench of the training space of FIG. 2 showing components of an assemblage.

The processor circuitry 20 causes the display 14 to sequentially display the ordered list of steps 42 of the received instruction set 40. The displaying of the steps includes displaying a current step 44 of the ordered list of steps 42 by visually highlighting a next object in the training space. The next object 50 is the next part 38 or the next tool 28. For example, in FIG. 3, three parts 38a, 38b, 38c are shown on the work bench 26. Component 38c is highlighted (e.g., using an outline) to signify that component 38c is the next object.

The highlighting of the next object 50 in the training space 22 may using any suitable visual effect for distinguishing the next object 50 from other objects 50 in the training space 22. For example, the next object 50 may be visually highlighted by altering a color or brightness of the next object 50, such that the next object 50 is visually distinctive from both other tools of the assortment of tools 28 and other components 30 arranged in the work area 24.

The displaying of the steps also includes detecting with the hand sensor 16 the user interacting with the highlighted next object 50 based on a mapping to the training space 22 of a measured location 52 of the hand 12 of the user. For example, in FIG. 3 a hand icon 54 is shown indicating a mapping of the hand 12 of the user to the training space 22. The hand icon 54 may act as visual feedback to the user, allowing the user to identify the location of their hand 12 to the virtual training space 22.

The hand sensor 16 may be any suitable device for sensing a location of a user's hand 12. For example, the hand sensor 16 may be a device (e.g., such as a haptic glove 58, controller, etc.) held by or worn on the user's hand 12 that detects a location of the user's hand 12. Alternatively or additionally, the hand sensor 16 may include a camera (e.g., attached to a headset worn by the user) for visually detecting a hand 12 of the user.

Upon detecting the user interacting with the highlighted next object 50, the processor circuitry 20 highlights a target location 56 either for placing the highlighted next object 50 or for interacting with using the highlighted next object 50. The target location includes a location in the work area, a tool of the assortment of tools, or a part of the assemblage. For example, turning to FIG. 4, the user has picked up part 38c from FIG. 3. Upon picking up the part 38c, a target location 56 is shown for placing the part 38c. The target location 56 may be highlighted in any suitable distinctive manner. For example, in FIG. 4, a partially transparent version of part 38c is shown in the location where the part 38c is to be placed.

When the user has completed the current step, the processor circuitry 20 repeatedly selects the next step 44 as the current step 44 of the ordered list of steps 42 and displays the current step 44 of the ordered list of steps 42 until completing all of the steps 44 in the instructions set 40 resulting in the assembling of the associated assemblage 36.

Figure 4:
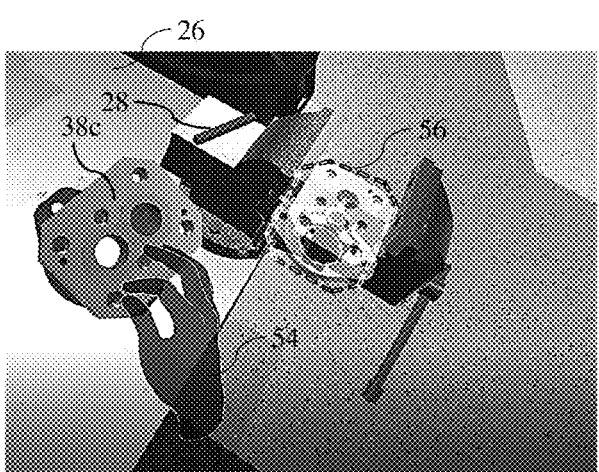
FIG. 4 is a is a zoomed in view of the work bench of FIG. 2 showing tools and a sub-combination of the assembly.
Figure 5:
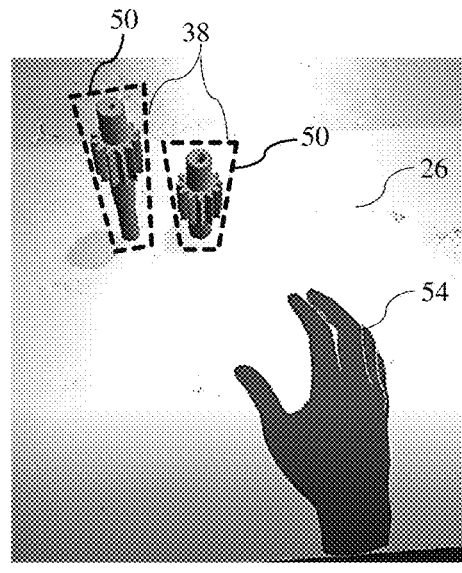
FIG. 5 is a zoomed in view of the work bench of FIG. 2 showing two highlighted components.
Figure 6:
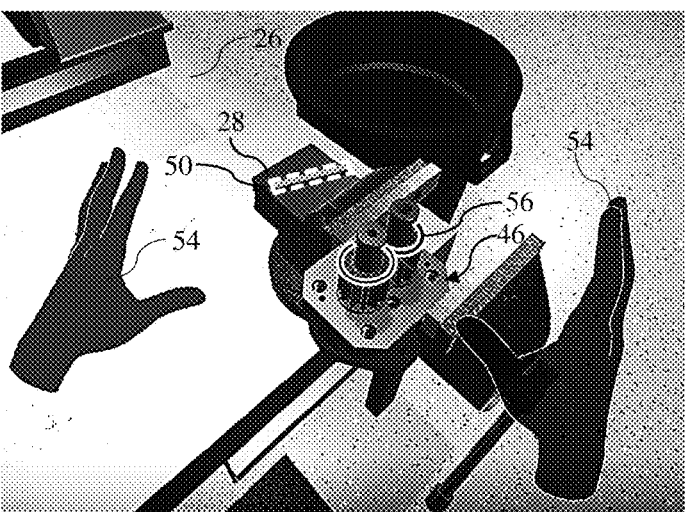
FIG. 6 is a zoomed in view of the work bench of FIG. 2 showing a highlighted tool and components to be processed using the highlighted tool.

For example, following the step shown in FIG. 4, the next step may be shown in FIG. 5 in which the next two parts 38 are highlighted. Once the user has placed these two parts 38 into the sub-combination 46 (not shown), the next step may be shown. For example, in the next step shown in FIG. 6, the next object 50 is a tool 28. In FIG. 6, the target location 56 is a part of the sub-combination 46. That is, the target location 56 is a portion of the sub-combination 46 that needs to be processed. In this example, a file is applied to a surface of two parts 38.

The processor circuitry 20 may have various implementations. For example, the processor circuitry 20 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 20 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 20. The processor circuitry 20 may be communicatively coupled to the computer readable medium and network interface through a system bus, mother board, or using any other suitable structure known in the art.

The display 14 may be any suitable device for displaying the training space 22 to the user. For example, the display 14 may be a head worn device such as a standard virtual reality device (e.g., Meta Quest, PlayStation VR, Oculus Rift, HTC VIVE, etc.). The processor circuitry 22 may be included in a same headset as the display 14. Alternatively or additionally, the processor circuitry 22 may be located separate from the display 14 and may communicate with the display 14 wired or wirelessly.

The virtual reality system 10 may include a haptic glove 58. The haptic glove 58 provide haptic feedback to the hand 12 of the user wearing the haptic glove. The haptic feedback is based on a property of an object the user interacts with in the training space 22. For example, the highlighted next object 50 may be a part 38 of the assemblage and the highlighted target location 56 may be a highlighted portion of the highlighted next object 50. That is, in a step 40 of the instruction set, a portion of an object 50 may be highlighted without highlighting a location to place the object 50 or a tool 28 to use to process the object 50. The user may instead interact with the highlighted portion by moving the hand 12 of the user against the highlighted portion. When the user interacts with the highlighted portion, the processor circuitry 20 may cause the haptic glove 58 to provide haptic feedback to the user indicating a surface property of the highlighted portion. The surface property may be any suitable property of an object. For example, the surface property may be roughness, texture, hardness, temperature, etc.

For example, the surface property may include an existence of a burr on the highlighted portion. That is, when the user interacts with the highlighted portion and the highlighted portion includes the burr, the processor circuitry 20 may cause the haptic glove 58 to provide haptic feedback signifying the existence of the burr. For example, the haptic feedback may feel to the hand 12 of the user as if the user ran their hand across a surface including a bump (i.e., like there is a burr on the surface the user ran her hand across).

When the user feels a burr on the highlighted portion, the processor circuitry 20 may highlight on the display as the next object 50 a surface processing tool of the tools 28 for removing the burr. The processor circuitry 20 may also highlight on the display as the target location 56 the highlighted portion including the burr.

The haptic glove 58 may be any suitable device for supplying haptic (also referred to as tactile) feedback to a user. For example, the haptic glove 58 may simulate a property (e.g., texture, weight, hardness, etc.) of a virtual object.

Turning again to FIG. 6, the highlighted next object may be a tool 28 and the target location 56 may include a highlighted part of the sub-combination 38. The user may interact with the highlighted part of the sub-combination 38 using the highlighted next object 50 by moving the highlighted next object 50 adjacent to the target location 56. The user may interact with the highlighted part of the sub-combination 38 resulting in the processing of the highlighted part based on the highlighted next object.

As shown in the transition between FIGS. 5 and 6, the highlighted next object 50 may be the next part 38 and the target location 56 may include a highlighted part of the sub-combination 38. The user may interact with the highlighted part of the sub-combination 38 using the highlighted next object 50 by moving the highlighted next object 50 adjacent to the target location 56. The user interacting with the highlighted part of the sub-combination 38 may result in the highlighted next object 50 being added to the sub-combination 46.

The training space 22 may include a manual 60 for providing access to the user of the ordered list of steps of the instruction set 42 for the selected assemblage 36. For example, the manual 60 may appear as a tablet computer (e.g., an iPad) and the steps 44 of the instruction set 40 may be displayed in text on the manual 60 while the steps 44 are also being shown by highlighting the parts and locations in the training space 22 as described above.

In one embodiment, as a user gains proficiency in assembling a particular assemblage 36, a difficulty of the training may be increased. At an easy difficulty, the steps may be visually displayed as described above. At a harder difficulty, the steps may only be displayed using the manual 60.

In one embodiment, the processor circuitry 20 also receives instructions from the user to move around the training space 22, such that a point of view of the user in the training space changes from a previous viewpoint to a new viewpoint. The displaying of the training space 22 by the processor circuitry 20 includes displaying the training space 22 from the new viewpoint of the training space. For example, the user may use a gesture to move from one area of the training space 22 to another area of the training space 22. As the user moves about the training space 22, the point of view shown in the display may alter as if the user physically moved within the training space 22.

In one embodiment the virtual reality system 10 is an augmented reality system. That is the display 14 shows a view of an environment 62 of the user including a graphics overlay 64. That is, instead of showing a completely virtual space, the display 14 shows the actual environment 62 of the user with graphics overlayed 64. In this embodiment, the processor circuitry 20 may identify (also referred to as mapping) within a work area of the environment a location and a profile of a work bench, an assortment of tools arranged in the work area, and components arranged in the work area. That is, instead of visually generated objects, the processor circuitry 20 identifies physical objects within the environment 62 of the user. In particular, the processor circuitry 20 identifies both a location and a profile (e.g., a shape) of the objects. The processor circuitry 20 may identify the objects using any suitable process. For example, the processor circuitry 20 may use visual object recognition from a camera positioned to image the work area. Alternatively or additionally, the objects may include identifying marks such as barcodes, infrared dots, serial numbers, etc. to aid in identification of the objects.

Figure 9:
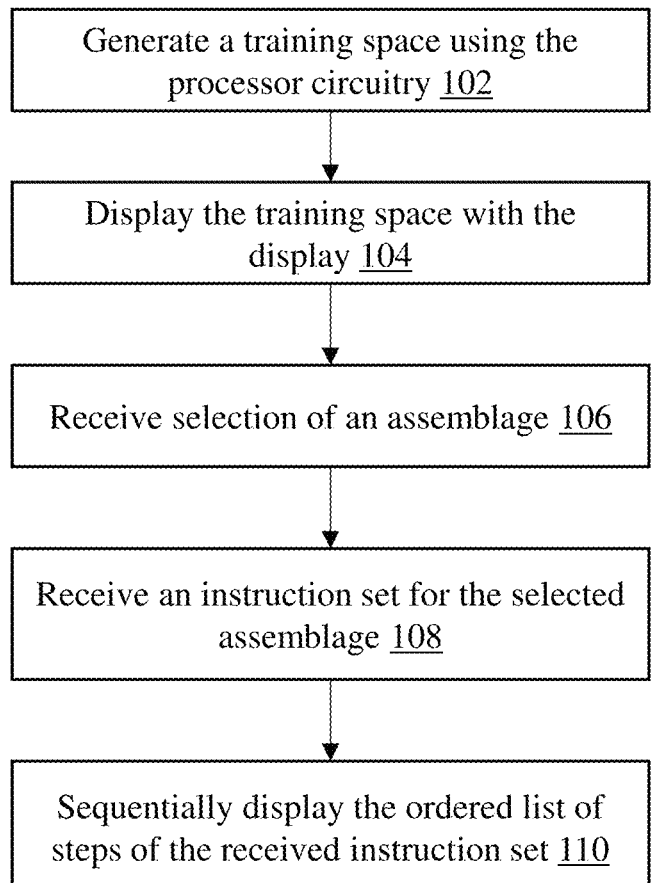
FIG. 9 is an exemplary method for training a user to assemble a device using a virtual reality system.

Turning to FIG. 9, an exemplary method 100 is shown for training a user to assemble a device using a virtual reality system 10 having a display 14, processor circuitry 20, and a hand sensor 16. In step 102, the processor circuitry 20 generates a three-dimensional (3D) training space 22. In step 104, the training space 22 is displayed to the user using the display 14. In step 106, a selection of an assemblage 36 is received. For example, the processor circuitry 20 may receive the selected assemblage 36 from the user via user input or the processor circuitry 20 may select the assemblage 36 based on a training program selected for the user. In step 108, the processor circuitry 20 receives from the collection of instructions 34 an instruction set 40 for the selected assemblage 36. For example, the processor circuitry 20 may retrieve the instruction set 40 from the memory 18. In step 110, the processor circuitry sequentially causes to be displayed on the display the ordered list of steps of the received instruction set.

Figure 7:
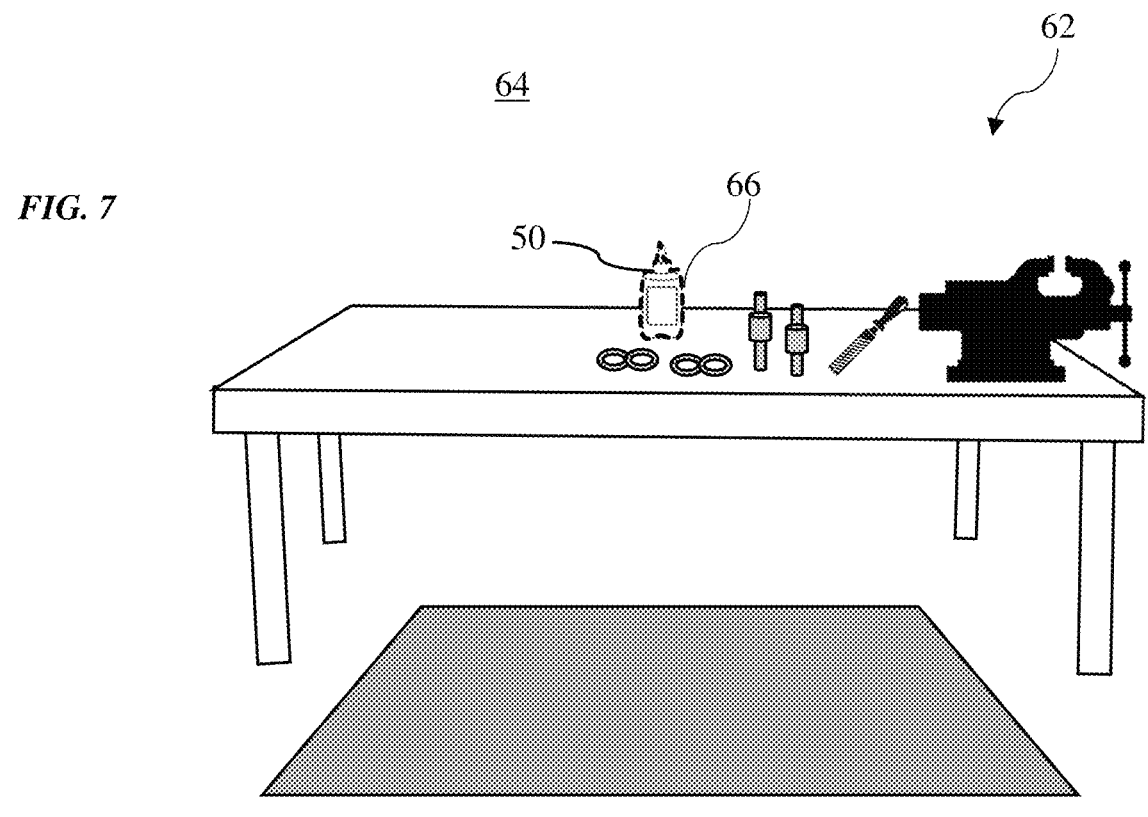
FIG. 7 is an exemplary view of an augmented reality system showing a graphics overlay on an environment of the user.
Figure 8:
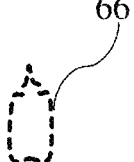
FIG. 8 is a view of only the graphics overlay of FIG. 7.

As described above, the augmented reality system may display the ordered list of steps for assembly an assemblage. In this embodiment, the processor circuitry 20 visually highlights a next object 50 in the graphics overlay 64. For example, the processor circuitry 20 may generate in the graphics overlay 64 an indicator 66 outlining the profile of the next object 50. Similarly, the processor circuitry 20 may generate in the graphics overlay an indicator 66 outlining the target location either for placing the highlighted next object or for interacting with using the highlighted next object. FIG. 7 depicts an exemplary display showing the environment 62 of the user and the graphics overlay 64. FIG. 8 shows only the graphics overlay of FIG. 8.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for training a user to assemble a device using a virtual reality system having a display, processor circuitry, and a hand sensor, the method comprising:

using the processor circuitry of the virtual reality system to generate a three-dimensional (3D) training space, wherein the training space includes a work area having a work bench, an assortment of tools arranged in the work area, and components arranged in the work area;

displaying the training space to the user using the display;

receiving a selection of an assemblage from a collection of assemblages, wherein:

each assemblage of the collection of assemblages is formed by combining parts of the assemblage; and the parts of the assemblage are a subset of the components arranged in the work area;

the processor circuitry receiving from a collection of instructions an instruction set for the selected assemblage, wherein:

each assemblage of the collection of assemblages is associated with an instruction set from the collection of instructions;

each instruction set of the collection of instructions includes an ordered list of steps performed to assemble the associated assemblage by combining the parts of the assemblage;

each step of the ordered list of steps:

results in a sub-combination of the assemblage by at least one of:

adding at least one of the parts to the sub-combination; or processing at least one of the parts of the assemblage using at least one tool of the assortment of tools;

identifies at least one of:

a next part of the parts of the assemblage for adding to the sub-combination;

a placement location for the next part; or a next tool of the assortment of tools for processing at least one of the parts of the assemblage;

the processor circuitry sequentially causing to be displayed on the display the ordered list of steps of the received instruction set including:

displaying a current step of the ordered list of steps by:

visually highlighting a next object in the training space, wherein the next object is the next part or the next tool;

detecting with the hand sensor the user interacting with the highlighted next object; and upon the detecting of the user interacting with the highlighted next object, highlighting a target location either for placing the highlighted next object or for interacting with using the highlighted next object, wherein the target location includes a location in the work area, a tool of the assortment of tools, or a part of the assemblage; and when the user has completed the current step, repeatedly selecting the next step as the current step of the ordered list of steps and displaying the current step of the ordered list of steps until completing all of the steps in the instructions set resulting in the assembling of the associated assemblage, wherein:

the virtual reality system includes a haptic glove configured to provide haptic feedback to the hand of the user wearing the haptic glove based on a property of an object the user interacts with in the training space;

the highlighted next object is a part of the assemblage;

the highlighted target location is a highlighted portion of the highlighted next object;

the user interacts with the highlighted portion by moving the hand of the user against the highlighted portion; and when the user interacts with the highlighted portion, the haptic glove provides haptic feedback to the user indicating a surface property of the highlighted portion, the surface property includes an existence of a burr on the highlighted portion; and when the user interacts with the highlighted portion and the highlighted portion includes the burr:

the haptic glove provides haptic feedback signifying the existence of the burr;

highlighting as the next object a surface processing tool of the tools for removing the burr; and highlighting as the target location the highlighted portion including the burr.

2. The method of claim 1, wherein:

the highlighted next object is a tool;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the processing of the highlighted part based on the highlighted next object.

3. The method of claim 1, wherein:

the highlighted next object is the next part;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the highlighted next object being added to the sub-combination.

4. The method of claim 1, wherein the training space includes a manual for providing access to the ordered list of steps of the instruction set for the selected assemblage.

5. The method of claim 1, wherein the visually highlighting of the next object in the training space includes altering a color or brightness of the next object, such that the next object is visually distinctive from both other tools of the assortment of tools and other components arranged in the work area.

6. The method of claim 1, further comprising:

providing controls for the user to move around the training space, such that a point of view of the user in the training space changes from a previous viewpoint to a new viewpoint, wherein the displaying of the training space by the processor circuitry includes displaying the training space from the new viewpoint of the training space.

7. A virtual reality system for training a user to assemble a device, the virtual reality system comprising:

a display configured to display a three-dimensional (3D) training space, wherein the training space includes a work area having a work bench, an assortment of tools arranged in the work area, and components arranged in the work area;

a hand sensor configured to detect a location of a hand of the user;

memory configured to store:

a collection of assemblages, wherein:

each assemblage of the collection of assemblages is formed by combining parts of the assemblage; and the parts of the assemblage are a subset of the components arranged in the work area; and a collection of instructions, wherein:

each assemblage of the collection of assemblages is associated with an instruction set from the collection of instructions;

each instruction set of the collection of instructions includes an ordered list of steps performed to assemble the associated assemblage by combining the parts of the assemblage; and each step of the ordered list of steps:

results in a sub-combination of the assemblage by at least one of adding at least one of the parts to the sub-combination, or processing at least one of the parts of the assemblage using at least one tool of the assortment of tools; and identifies at least one of a next part of the parts of the assemblage for adding to the sub-combination, a placement location for the next part, or a next tool of the assortment of tools for processing at least one of the parts of the assemblage; and processor circuitry configured to:

generate and cause the display to display the training space;

receive a selection of an assemblage from the collection of assemblages;

receive from the collection of instructions an instruction set for the selected assemblage; and sequentially cause to be displayed on the display the ordered list of steps of the received instruction set including:

displaying a current step of the ordered list of steps by:

visually highlighting a next object in the training space, wherein the next object is the next part or the next tool;

detecting with the hand sensor the user interacting with the highlighted next object based on a mapping to the training space of a measured location of the hand of the user; and upon the detecting of the user interacting with the highlighted next object, highlighting a target location either for placing the highlighted next object or for interacting with using the highlighted next object, wherein the target location includes a location in the work area, a tool of the assortment of tools, or a part of the assemblage; and when the user has completed the current step, repeatedly selecting the next step as the current step of the ordered list of steps and displaying the current step of the ordered list of steps until completing all of the steps in the instructions set resulting in the assembling of the associated assemblage, further comprising a haptic glove configured to provide haptic feedback to the hand of the user wearing the haptic glove based on a property of an object the user interacts with in the training space, wherein:

the highlighted next object is a part of the assemblage;

the highlighted target location is a highlighted portion of the highlighted next object;

the user interacts with the highlighted portion by moving the hand of the user against the highlighted portion; and when the user interacts with the highlighted portion, the processor circuitry causes the haptic glove to provide haptic feedback to the user indicating a surface property of the highlighted portion, wherein:

the surface property includes an existence of a burr on the highlighted portion; and when the user interacts with the highlighted portion and the highlighted portion includes the burr, the processor circuitry:

causes the haptic glove to provide haptic feedback signifying the existence of the burr;

highlights on the display as the next object a surface processing tool of the tools for removing the burr; and highlights on the display as the target location the highlighted portion including the burr.

8. The virtual reality system of claim 7, wherein:

the highlighted next object is a tool;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the processing of the highlighted part based on the highlighted next object.

9. The virtual reality system of claim 7, wherein:

the highlighted next object is the next part;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the highlighted next object being added to the sub-combination.

10. The virtual reality system of claim 7, wherein the training space includes a manual for providing access to the user of the ordered list of steps of the instruction set for the selected assemblage.

11. The virtual reality system of claim 7, wherein the visually highlighting of the next object in the training space includes altering a color or brightness of the next object, such that the next object is visually distinctive from both other tools of the assortment of tools and other components arranged in the work area.

12. The virtual reality system of claim 7, wherein the processor circuitry is further configured to:

receive instructions from the user to move around the training space, such that a point of view of the user in the training space changes from a previous viewpoint to a new viewpoint, wherein the displaying of the training space by the processor circuitry includes displaying the training space from the new viewpoint of the training space.

13. An augmented reality system for assisting a user in the assembly of a device, wherein the augmented reality system comprises:

a display configured to display a view of an environment of the user including a graphics overlay;

processor circuitry configured to identify within a work area of the environment a location and a profile of: a work bench, an assortment of tools arranged in the work area, and components arranged in the work area;

a hand sensor configured to detect a location of a hand of the user;

memory configured to store:

a collection of assemblages, wherein:

each assemblage of the collection of assemblages is formed by combining parts of the assemblage; and the parts of the assemblage are a subset of the components arranged in the work area;

a collection of instructions, wherein:

each assemblage of the collection of assemblages is associated with an instruction set from the collection of instructions;

each instruction set of the collection of instructions includes an ordered list of steps performed to assemble the associated assemblage by combining the parts of the assemblage;

each step of the ordered list of steps:

results in a sub-combination of the assemblage by at least one of adding at least one of the parts to the sub-combination, or processing at least one of the parts of the assemblage using at least one tool of the assortment of tools;

identifies at least one of a next part of the parts of the assemblage for adding to the sub-combination, a placement location for the next part, or a next tool of the assortment of tools for processing at least one of the parts of the assemblage;

wherein the processor circuitry is further configured to:

map within the work area the location and the profile of the work bench, the assortment of tools, and the components;

receive a selection of an assemblage from the collection of assemblages;

receive from the collection of instructions an instruction set for the selected assemblage sequentially cause to be displayed on the graphics overlay the ordered list of steps of the received instruction set including:

displaying a current step of the ordered list of steps by:

visually highlighting a next object in the graphics overlay, wherein the next object is the next part or the next tool;

detecting with the hand sensor the user interacting with the highlighted next object; and upon the detecting of the user interacting with the highlighted next object, highlighting in the graphics overlay a target location either for placing the highlighted next object or for interacting with using the highlighted next object, wherein the target location includes a location in the work area, a tool of the assortment of tools, or a part of the assemblage; and when the user has completed the current step, repeatedly selecting the next step as the current step of the ordered list of steps and displaying the current step of the ordered list of steps until completing all of the steps in the instructions set resulting in the assembling of the associated assemblage, further comprising a haptic glove configured to provide haptic feedback to the hand of the user wearing the haptic glove based on a property of an object the user interacts with in the training space, wherein:

the highlighted next object is a part of the assemblage;

the highlighted target location is a highlighted portion of the highlighted next object;

the user interacts with the highlighted portion by moving the hand of the user against the highlighted portion; and when the user interacts with the highlighted portion, the processor circuitry causes the haptic glove to provide haptic feedback to the user indicating a surface property of the highlighted portion, wherein:

the surface property includes an existence of a burr on the highlighted portion; and when the user interacts with the highlighted portion and the highlighted portion includes the burr, the processor circuitry:

causes the haptic glove to provide haptic feedback signifying the existence of the burr;

highlights on the display as the next object a surface processing tool of the tools for removing the burr; and highlights on the display as the target location the highlighted portion including the burr.

14. The augmented reality system of claim 13, wherein:

the highlighted next object is a tool;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the processing of the highlighted part based on the highlighted next object.

15. The augmented reality system of claim 13, wherein:

the highlighted next object is the next part;

the target location includes a highlighted part of the sub-combination; and the user interacts with the highlighted part of the sub-combination using the highlighted next object by moving the highlighted next object adjacent to the target location; and the user interacts with the highlighted part of the sub-combination results in the highlighted next object being added to the sub-combination.

16. The augmented reality system of claim 13, wherein the visually highlighting of the next object in the graphics overlay includes altering a color or brightness of the next object, such that the next object is visually distinctive from both other tools of the assortment of tools and other components arranged in the work area.

\* \* \* \* \*